United States Patent
Gibson et al.

(10) Patent No.: US 8,128,399 B1
(45) Date of Patent: Mar. 6, 2012

(54) METHOD AND APPARATUS FOR CONTROLLING GAS FLOW PATTERNS INSIDE A HEATER CHAMBER AND EQUALIZING RADIANT HEAT FLUX TO A DOUBLE FIRED COIL

(75) Inventors: William C. Gibson, Tulsa, OK (US); Robert L. Gibson, Broken Arrow, OK (US)

(73) Assignee: Great Southern Flameless, LLC, Broken Arrow, OK (US)

( * ) Notice: Subject to any disclaimer, the term of this patent is extended or adjusted under 35 U.S.C. 154(b) by 192 days.

(21) Appl. No.: 12/035,838

(22) Filed: Feb. 22, 2008

(51) Int. Cl.
*F23M 3/00* (2006.01)

(52) U.S. Cl. ............... 431/8; 431/12; 432/175; 432/22; 432/31

(58) Field of Classification Search .............. 431/8, 12; 432/22, 31, 175
See application file for complete search history.

(56) References Cited

U.S. PATENT DOCUMENTS

| | | | | |
|---|---|---|---|---|
| 2,826,182 | A * | 3/1958 | Mandelburg | 122/155.1 |
| 2,936,724 | A * | 5/1960 | Bishop | 110/254 |
| 2,993,479 | A * | 7/1961 | Thurley | 122/23 |
| 2,994,724 | A * | 8/1961 | Segura et al. | 585/354 |
| 3,065,741 | A * | 11/1962 | Gerard | 122/250 R |
| 3,231,014 | A * | 1/1966 | Koenig | 165/133 |
| 3,291,104 | A * | 12/1966 | Zimmerman | 122/240.1 |
| 3,334,971 | A * | 8/1967 | Chevion et al. | 422/629 |
| 3,405,691 | A * | 10/1968 | Wallace et al. | 122/240.1 |
| 3,563,211 | A * | 2/1971 | Hornbostel, Jr. | 122/250 R |
| 3,664,928 | A * | 5/1972 | Roberts | 202/236 |
| 3,736,797 | A * | 6/1973 | Brown | 73/861.64 |
| 3,841,301 | A * | 10/1974 | Chamberlain | 126/110 R |
| 4,008,128 | A * | 2/1977 | Dorner | 196/110 |
| 4,098,582 | A * | 7/1978 | Takeda | 23/293 R |
| 4,292,810 | A * | 10/1981 | Glenn | 60/757 |
| 4,324,649 | A * | 4/1982 | Parizot et al. | 208/130 |
| 4,412,975 | A * | 11/1983 | Parizot et al. | 422/197 |
| 4,454,839 | A * | 6/1984 | Gater et al. | 122/333 |
| 4,494,485 | A * | 1/1985 | Kendall et al. | 122/250 R |
| 4,577,611 | A * | 3/1986 | Hagino | 123/669 |
| 4,580,973 | A * | 4/1986 | Mansperger et al. | 432/194 |
| 5,005,635 | A * | 4/1991 | Zanoli et al. | 165/9.1 |
| 5,062,409 | A * | 11/1991 | Kamanaka et al. | 126/99 R |
| 5,154,599 | A * | 10/1992 | Wunning | 431/215 |
| 5,224,538 | A * | 7/1993 | Jacoby | 165/166 |
| 5,372,706 | A * | 12/1994 | Buchanan et al. | 208/113 |
| 5,595,205 | A * | 1/1997 | Sirovich et al. | 137/13 |
| 5,797,414 | A * | 8/1998 | Sirovich et al. | 137/13 |
| 5,848,768 | A * | 12/1998 | Seyfang | 244/198 |
| 5,873,356 | A * | 2/1999 | Vossler et al. | 126/110 E |
| 5,975,462 | A * | 11/1999 | Platzer | 244/11 |
| 6,006,823 | A * | 12/1999 | Kiknadze et al. | 165/133 |
| 6,095,097 | A * | 8/2000 | Gibson et al. | 122/367.1 |

(Continued)

FOREIGN PATENT DOCUMENTS

JP 2003227695 A * 8/2003

*Primary Examiner* — Kenneth Rinehart
*Assistant Examiner* — Jorge Pereiro
(74) *Attorney, Agent, or Firm* — King & Spalding LLP

(57) ABSTRACT

A method and apparatus for controlling the flow of combustion air, fuel and products of combustion in a heater and equalizing radiant heat flux by providing a structure on one or more of the heater walls that attaches the boundary layer and main flow to the heater wall and increases wall surface area and view angles.

21 Claims, 6 Drawing Sheets

U.S. PATENT DOCUMENTS

| | | | |
|---|---|---|---|
| 6,120,285 A * | 9/2000 | Smith | 432/152 |
| 6,241,855 B1 * | 6/2001 | Gibson et al. | 202/124 |
| 6,264,798 B1 * | 7/2001 | Gibson et al. | 202/124 |
| 6,538,887 B2 * | 3/2003 | Belady et al. | 361/695 |
| 6,644,921 B2 * | 11/2003 | Bunker et al. | 416/97 R |
| 6,796,789 B1 | 9/2004 | Gibson et al. | |
| 6,852,294 B2 * | 2/2005 | Doerksen | 422/200 |
| 6,877,979 B2 * | 4/2005 | Abbasi et al. | 431/8 |
| 7,036,366 B2 * | 5/2006 | Emmert et al. | 73/202.5 |
| 7,182,046 B2 * | 2/2007 | Wade et al. | 123/27 R |
| 7,331,752 B2 * | 2/2008 | Kiknadze et al. | 415/1 |
| 7,524,411 B2 * | 4/2009 | Doerksen | 208/132 |
| 2003/0021089 A1 * | 1/2003 | Belady et al. | 361/695 |
| 2004/0096795 A1 * | 5/2004 | Abbasi et al. | 432/20 |
| 2004/0240984 A1 * | 12/2004 | Kiknadze et al. | 415/1 |
| 2005/0241605 A1 * | 11/2005 | Bedwell et al. | 123/184.21 |
| 2005/0262937 A1 * | 12/2005 | Emmert et al. | 73/202.5 |
| 2007/0154855 A1 * | 7/2007 | Gibson et al. | 431/9 |
| 2007/0193726 A1 * | 8/2007 | Vida | 165/133 |
| 2007/0245742 A1 * | 10/2007 | Dahlke et al. | 60/754 |
| 2007/0269755 A2 * | 11/2007 | Gibson et al. | 431/9 |
| 2008/0003531 A1 * | 1/2008 | Abbasi et al. | 431/215 |
| 2008/0023180 A1 * | 1/2008 | Bunker et al. | 165/109.1 |
| 2008/0043431 A1 * | 2/2008 | Marotta et al. | 361/689 |
| 2009/0090423 A1 * | 4/2009 | Kiknadze et al. | 138/39 |

* cited by examiner

METHOD AND APPARATUS FOR CONTROLLING GAS FLOW PATTERNS INSIDE A HEATER CHAMBER AND EQUALIZING RADIANT HEAT FLUX TO A DOUBLE FIRED COIL

FIELD OF THE INVENTION

The present invention relates generally to an apparatus and method for improving the circulation of combustion air, fuel and products of combustion within a heater chamber. More particularly, the present invention relates to a method and apparatus for maintaining the flow of these gases adjacent to the heater interior wall and equalizing radiant heat flux to a double fire coil.

BACKGROUND OF THE INVENTION

The circulation and flow of fuel, combustion air and products of combustion within a heater chamber play a key role in heat transfer and optimum combustion. While this is true for conventional combustion, it is especially true when dealing with flameless combustion.

Flameless combustion is dependent upon the proper mixture of fuel, preheat combustion air and products of combustion. The products of combustion inert the fuel and air mixture to help insure complete combustion without a visible flame. One of the key factors in establishing an efficient and repeatable circulation pattern within a heater is to insure that the boundary layer remains adhered to the surface of the heater wall.

Flow adjacent to a heater wall separates into two streams, a boundary layer and the main flow. The boundary layer is a thin layer of gases which move along the surface of the wall in between the surface of the wall and the main flow of gases. As long as this boundary layer does not separate from the wall, it insures that the main flow of gases are not disrupted.

The boundary layer starts out as a laminar flow. However, as the boundary layer flows across the flat surface of a heater wall, the friction of this boundary layer moving along the surface wall creates an adverse pressure gradient. As this pressure gradient builds, it eventually becomes as great as the pressure in the laminar flow of the boundary layer. At this point, the boundary layer separates from the surface of the heater wall and disrupts the main flow of gases.

Previous flameless combustion applications have attempted to overcome this problem by using heater enclosures which are circular or oval in shape. Thus, as the combustion air, fuel and products of combustion move along the surface of the heater wall, they develop a centrifugal force which forces the boundary layer to remain adjacent to the wall.

One disadvantage of utilizing centrifugal forces to hold the gases against the wall is that it limits design flexibility. The heater enclosure must be oval shaped. Other shapes have advantages in cost and performance based on the process fluid being heated and other design considerations.

What is needed, therefore, is an apparatus and method to maintain the flow of the gases adjacent to the heater wall without relying on a circular or oval heater configuration.

BRIEF SUMMARY OF THE INVENTION

The present invention is a method and apparatus to improve the circulation pattern and flow of combustion air, fuel and products of combustion through a heater. In addition, to improve or equalize the radiant heat flux from the heater wall to a double fired coil. This is accomplished by providing a plurality of dimples or other structures on the inner surface of the heater wall. Dimples or other structures create beneficial pressure gradients that attach the boundary layer and main flow against the heater wall.

The turbulent flow created by dimples or other structures has a higher velocity than the laminar flow and in turn greater momentum. The greater momentum allows the turbulent flow to overcome the adverse pressure gradient. This prevents the turbulent gas flow from separating from the wall of the heater. Because the boundary layer does not separate from the wall of the heater it does not disrupt the main flow of gases and thus achieves the desirable results of holding gases in circulation against the heater wall.

The present invention has an advantage over the prior art in that it can be adapted for use in virtually all heater enclosures. The heater enclosure may be any shape, including curved or straight sidewalls that in series complete the enclosure. The present invention provides design flexibility while controlling gas circulation in a heater.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
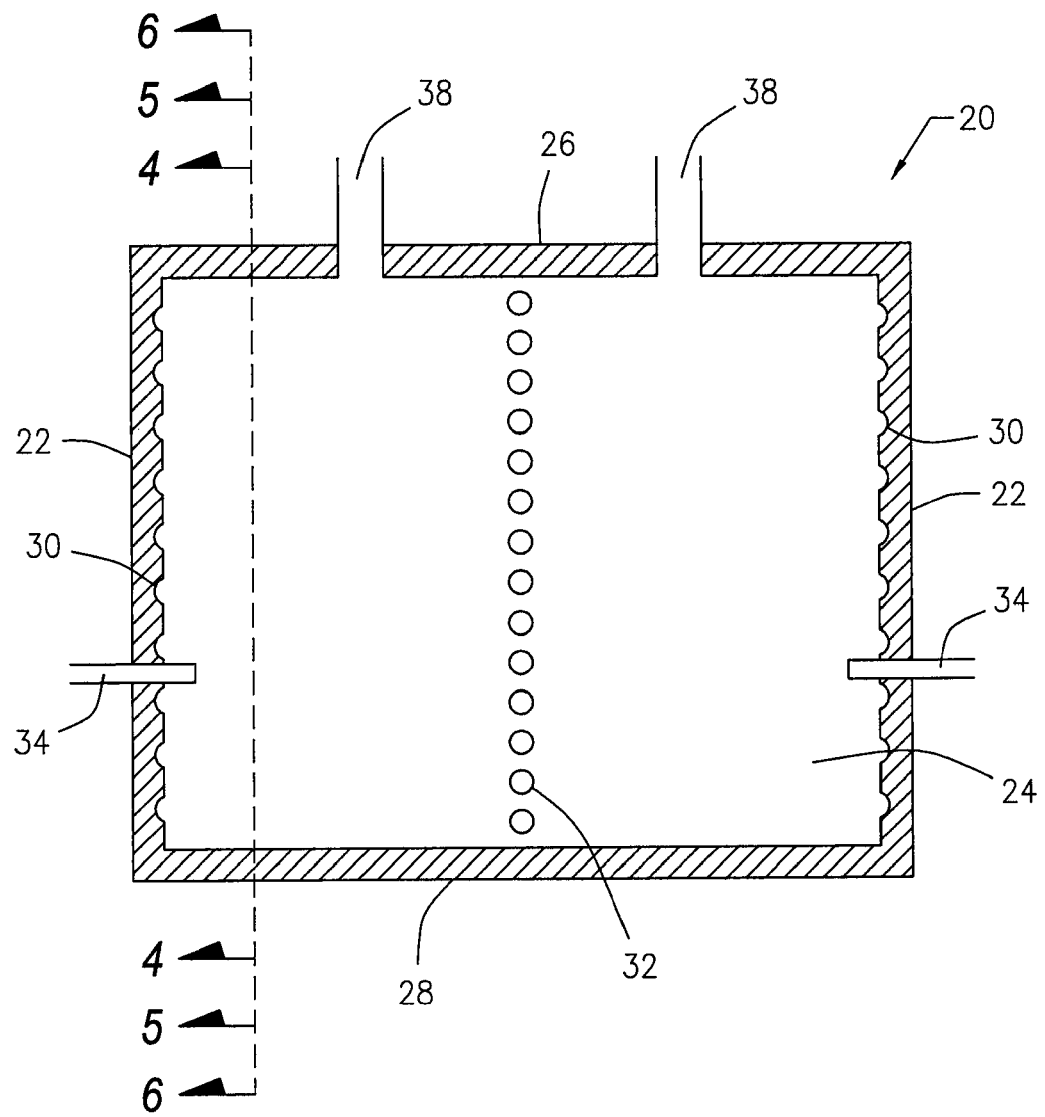
FIG. 1 is a cross-sectional view of the radiant section of a double fired heater.

Turning now to the drawings wherein like reference characters indicate like or similar parts throughout, FIG. 1 illustrates a cross-sectional view of a radiant heater 20. The radiant heater 20 has a pair of opposing sidewalls 22, a pair of opposing end walls 24 (Note: due to the cross-sectional view, FIG. 1 only shows one of the end walls 24), and an opposing top wall 26 and bottom wall 28. The sides walls 22 of the present invention are lined with dimples 30 to aid in creating a beneficial flow of combustion air, fuel, and products of combustion. The benefits of the dimples 30 will be discussed in greater detail below.

The heater 20 has a tube bundle 32 which run which parallel with the sidewalls 22 and the top and bottom walls 26 and 28. The heater 20 also has a fuel supply 34, and exhaust 38. Combustion occurs on both sides of the tube bundle 32 inside the heater 20. Heat from this combustion is transferred to various fluids flowing through the tube bundle 32. While some heat transfer occurs through convection and conductive heat transfer, the majority of the heat transferred into the tube bundle 32 occurs through radiant heat transfer.

While FIG. 1 shows the cross-section of a double fired radiant heater 20, the present invention can also be used on other types of combustion chambers where it is beneficial to maintain the flow of combustion air, fuel, and products of combustion adjacent to a surface.

Figure 2:
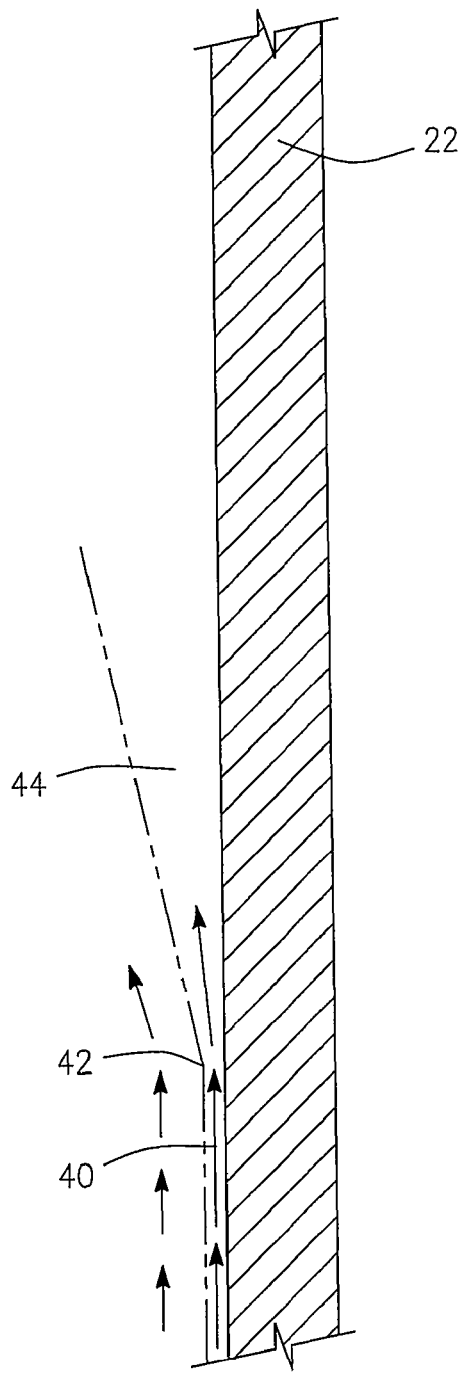
FIG. 2 is a cross-sectional view illustrating the separation of a boundary layer as gases flow along the sidewall of the prior art double fired heater.

FIG. 2 shows a cross-sectional view of the flow of these components along a flat sidewall 22 as known in the prior art. The flow establishes a boundary layer 40. The flow in this boundary layer is initially laminar and adheres tightly along the sidewall 22. As the flow continues along the sidewall 22, it encounters an adverse pressure gradient which causes the air flow to slow down and lose momentum. As the pressure continues to increase, the flow continues to slow down until it reaches a speed of zero. At this point, the point of separation 42, the flow no longer has any forward momentum so it separates from the sidewall 22 spreading out away from the sidewall 22 and creating an area of disorganized flow 44. This area of disorganized flow 44 is undesirable. With conventional combustion, it can cause hot gas or flame impingement on the heater tubes 32. This increases fouling, reduces run lengths, and can shorten the life of the process coil. With flameless combustion, the inability to control gas circulation patterns can overheat the mixture causing a visible flame or quench the mixture and stop combustion.

Figure 3:
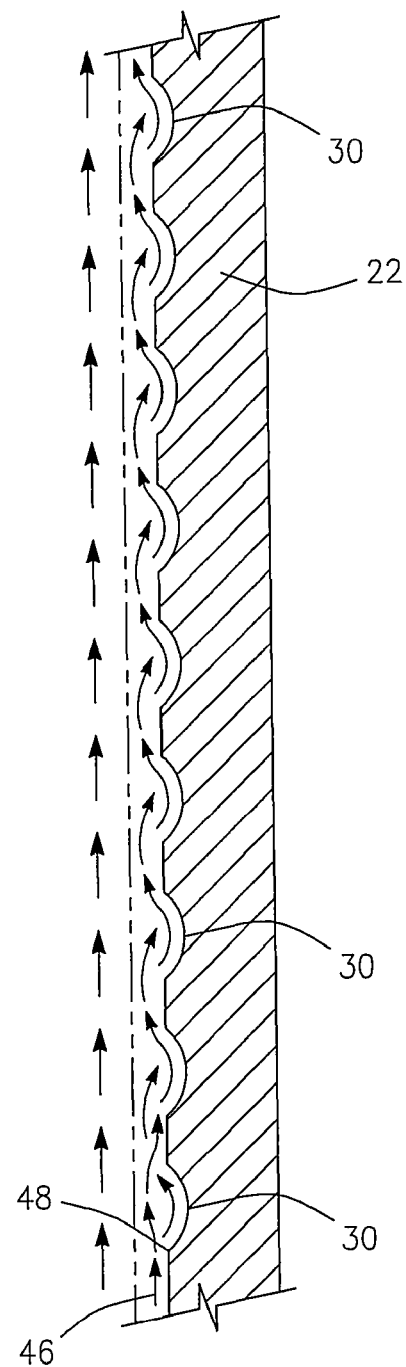
FIG. 3 is a cross-sectional view of turbulent gas flow of the boundary layer along a sidewall of a double fired heater incorporating the present invention.

FIG. 3 shows a sidewall 22 incorporating the present invention with a plurality of dimples 30. Here the boundary layer 46 starts out as a laminar flow. However, the dimple 30 creates a trip 48 which causes the laminar flow to become a turbulent flow. The turbulent flow in the boundary layer is faster than the original laminar flow. This maintains the momentum of the flow and resists the adverse pressure gradient causing separation. Thus, the boundary 46 is maintained close to the wall. This prevents the boundary layer 46 from separating from the sidewall 22 and creating the adverse effects noted above.

Figure 4:
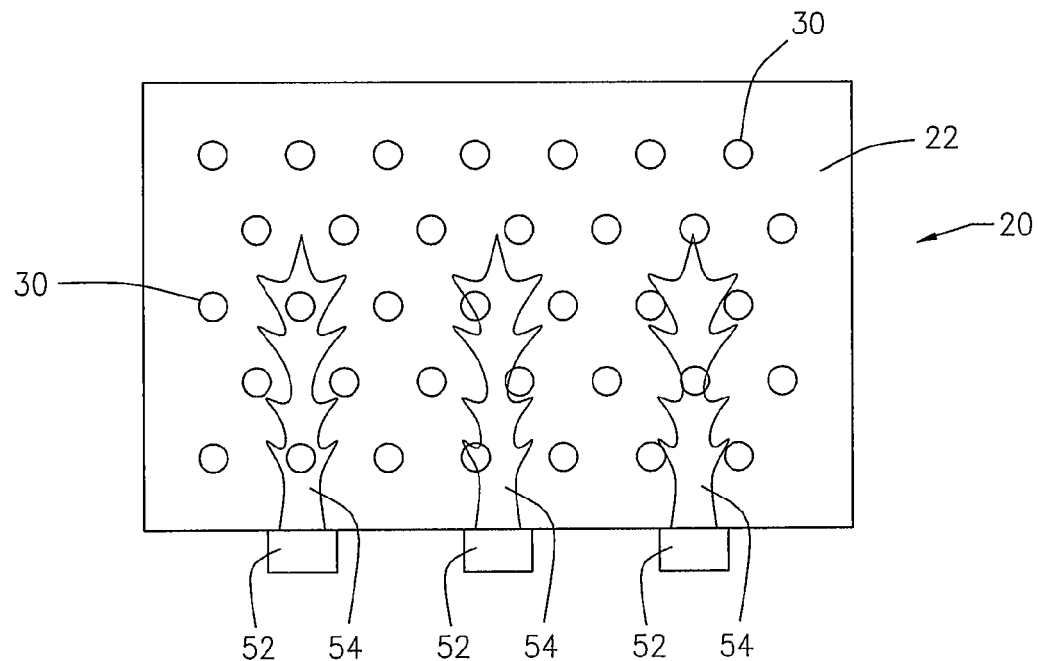
FIG. 4 is an elevation view of the sidewall shown in FIG. 1 in use with a plurality of conventional combustion fuel supply tips or burners.

The present invention can be used with various types of fuel supply tips and tip configurations. FIG. 4 shows the present invention in use with a plurality of conventional combustion fuel supply tips 52 or burners. The fuel supply tips 52 provide a flame 54 extending up parallel with the sidewall 22. The dimples 30 maintain the flow of the flame 54 adjacent to the sidewall 22.

Figure 5:
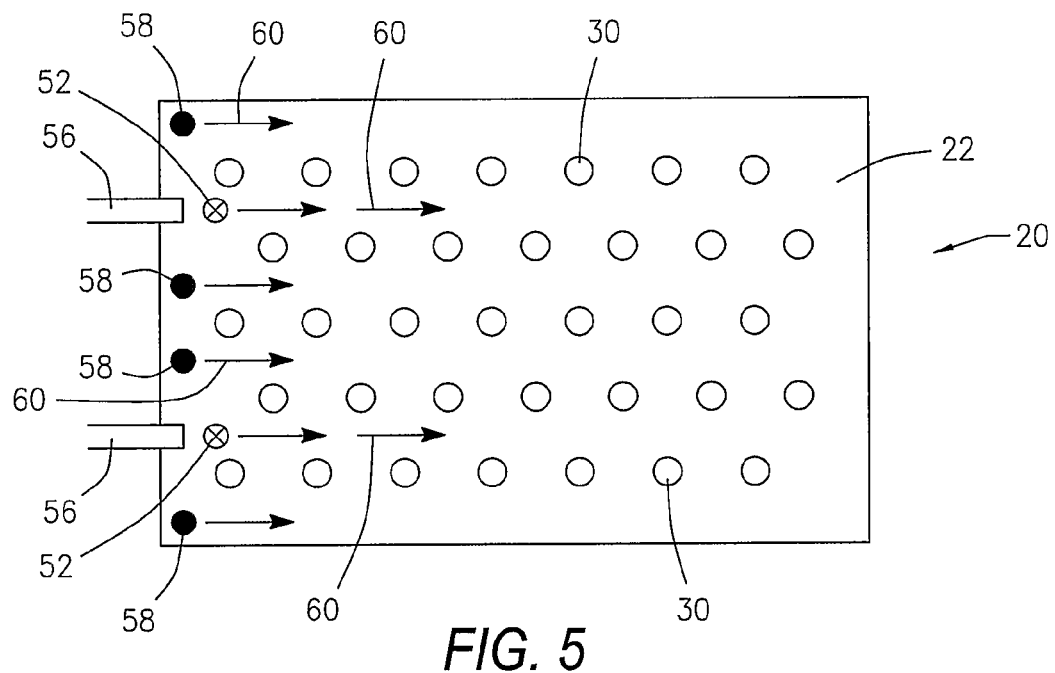
FIG. 5 is an elevation view of the sidewall shown in FIG. 1 in use with flameless combustion fuel supply tips and conventional combustion fuel supply tips.

FIG. 5 provides an elevation view of the present invention used in conjunction with a flameless combustion arrangement. Air is supplied via the combustion air supply nozzles 56. The combustion process is initiated with conventional combustion from the conventional combustion fuel supply tips 52. Once the conditions inside the heater 20 are sufficient to support flameless combustion the supply of fuel is redirected from the conventional combustion fuel supply tips 52 to the flameless combustion fuel supply tips 58. The flow of gases through the heater 20 are indicated by the arrows 60. Here again the dimples 30 maintain the flow adjacent to the sidewall 22.

Figure 6:
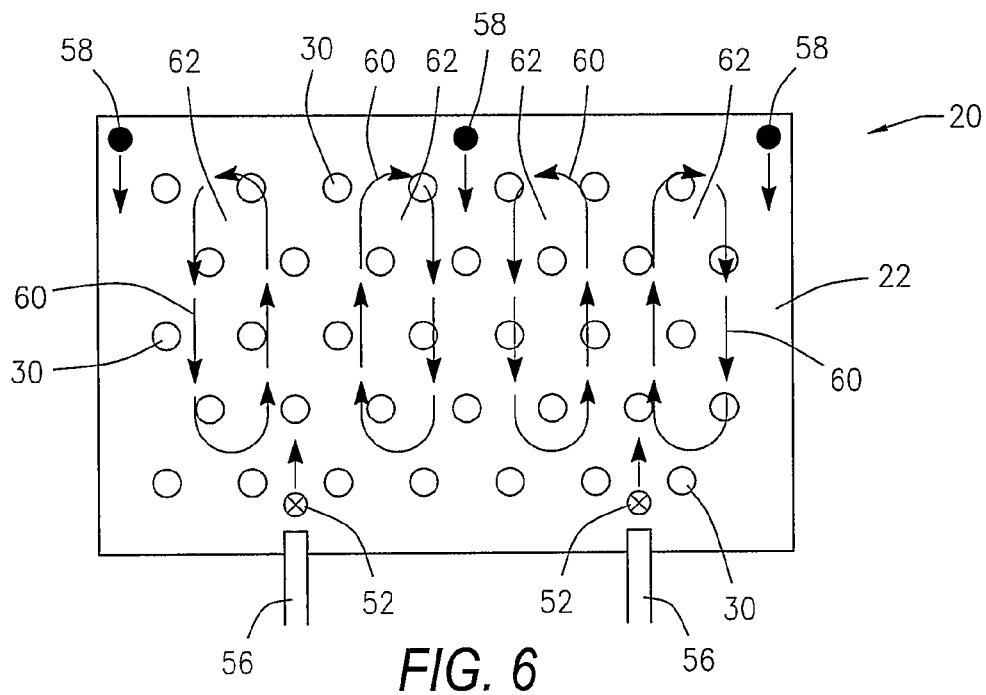
FIG. 6 is an elevation view of the sidewall shown in FIG. 1 in use with another arrangement of flameless combustion fuel supply tips and conventional combustion fuel supply tips.

FIG. 6 shows the present invention incorporated into a second flameless combustion arrangement. Just as in FIG. 5 the combustions is initiated using conventional combustion supplied with fuel from the conventional combustion fuel supply tips 52. Once conditions in the heater are sufficient to support flameless combustion the supply of fuel is transferred to the flameless combustion fuel supply tips 58. Air is supplied by the combustion air nozzles 56. The layout of the fuel supply tips 52, 58 and combustion air nozzles 56 induces a plurality of zones 62 of circulation where the gases flow up the sidewall 22 and back down as indicated by the arrows 60. The dimples 30 maintain this flow pattern in close proximity to the sidewalls 22. In both conventional combustion and flameless combustion, radiant heat transfer to the tube bundle is equalized and flame on hot gas impingement is eliminated.

Figure 7:
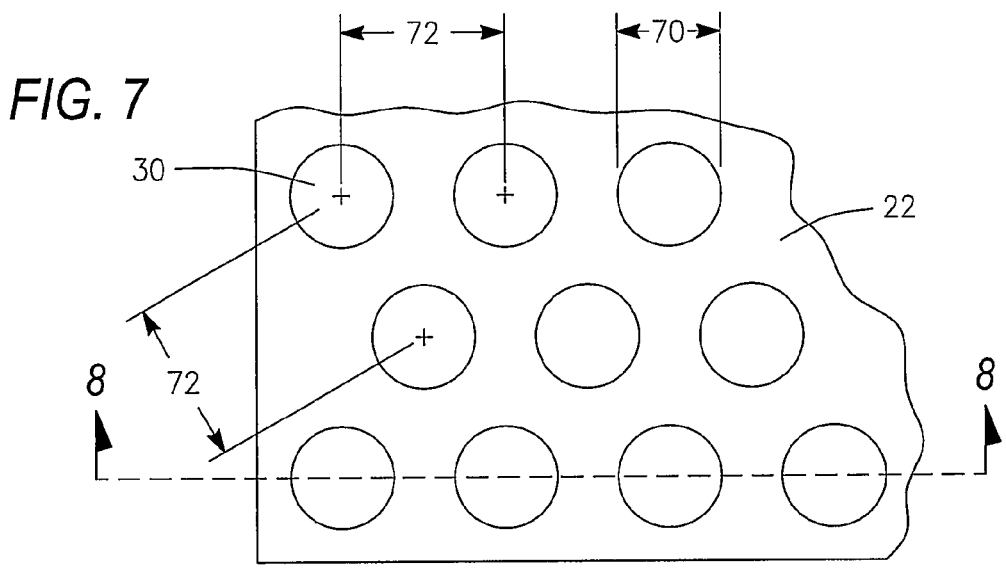
FIG. 7 is an elevation view of a heater wall incorporating one embodiment of the present invention.
Figure 8:
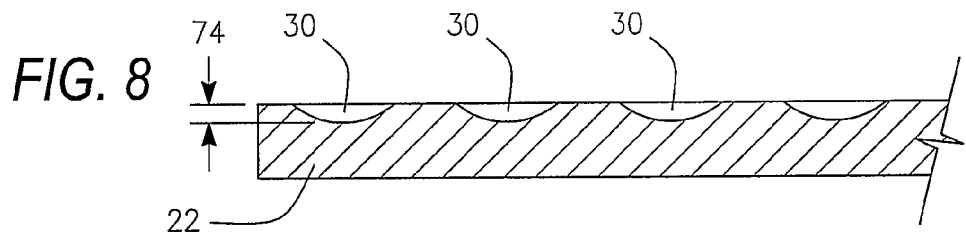
FIG. 8 is a cross-sectional view of the embodiment shown in FIG. 7.

Turning now to FIGS. 7 and 8 which show one embodiment of the possible layout of the dimples 30. In the embodiment shown in FIGS. 7 and 8 the dimples 30 have a diameter 70 of approximately six inches with an offset 72 of approximately nine inches. The cross-sectional view shown in FIG. 8 illustrates the dimples 30 to have a depth 74 of approximately ¾ inch. It also can be seen in FIG. 7 that the rows of dimples 30 are offset relative to one another. While FIGS. 7 and 8 show one embodiment of an array of dimples 30, it should be understood various other arrangement of dimples 30, or other types of structures such as ridges, could be used to create these arrays of structures used to create a beneficial pressure gradient.

Another advantage of a dimpled surface in accordance with FIGS. 7 and 8 is an increase of the sidewall 22 surface area and view angles. This equalizes the radiant heat flux to any double fired coil (heat absorbing coil receiving radiation from two sides). The radiant sidewall 22 surface area is increased by 2.5% (layout of FIG. 7 and FIG. 8). Flux equalization is beneficial since it reduces peak radiant flux rates to a double fired coil and thus reduces tube fouling.

Figure 9:
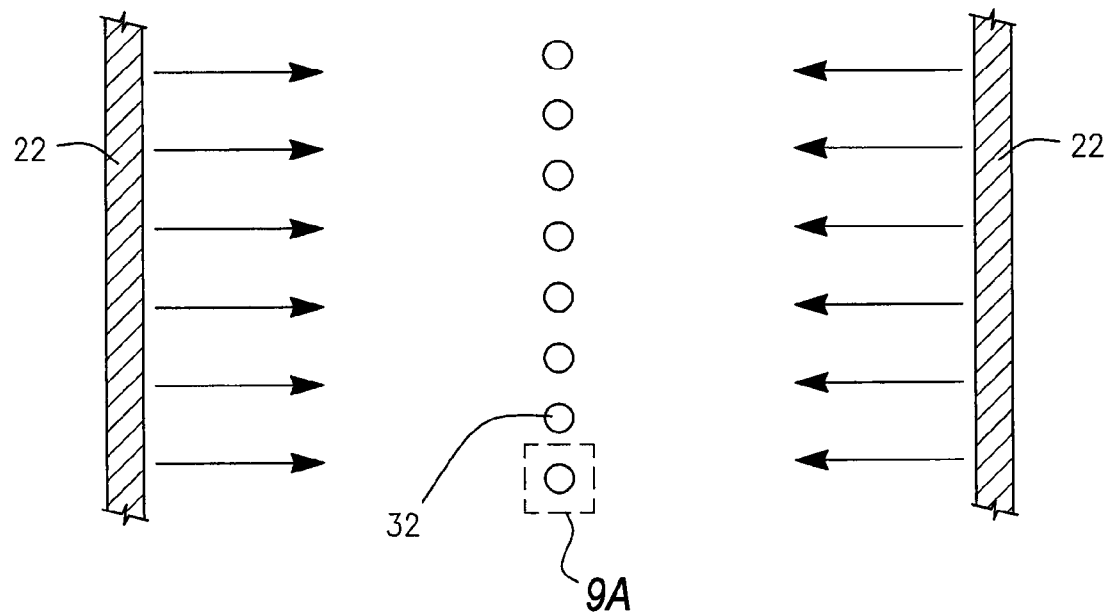
FIG. 9 is a cross-sectional view of a prior art radiant section double fired heater.
Figure 9A:
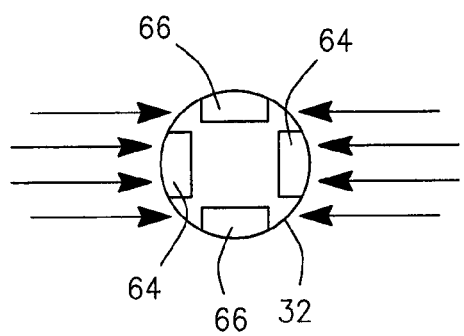
FIG. 9A is an enlarged view of the heater tube indicated in FIG. 9.
Figure 10:
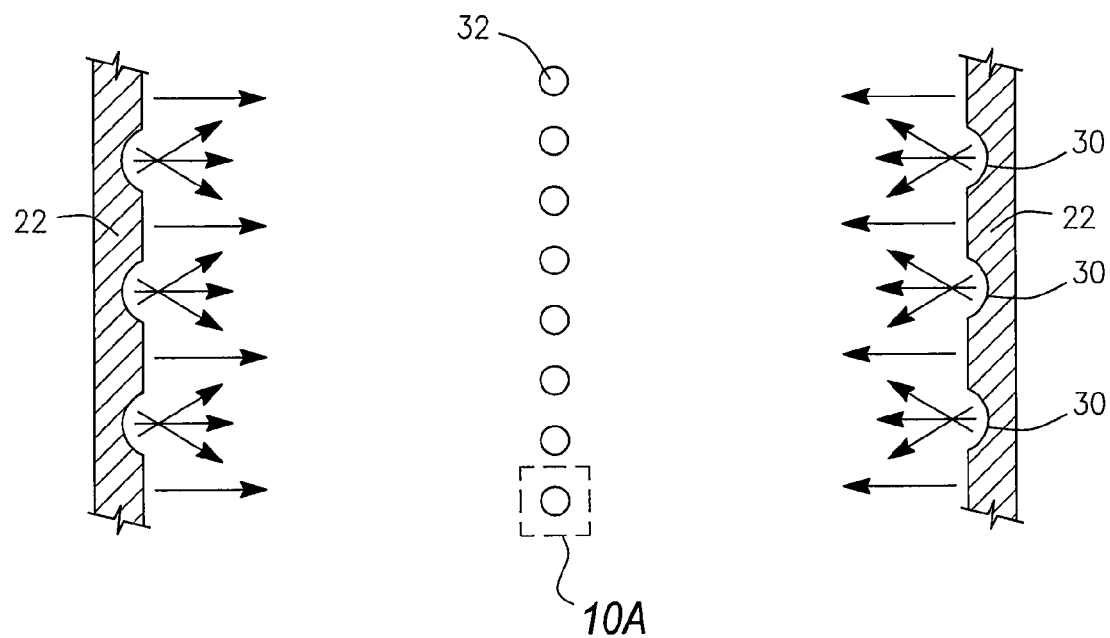
FIG. 10 is a cross-sectional view of the radiant section of a double fired heater incorporating the present invention.

The advantage of the increased wall surface area and view angles is best illustrated in FIGS. 9 and 10. With the prior art the radiant heat transmitted and reflected from the sidewalls 22 travels perpendicular away from the sidewalls 22 and towards the tube bundle 32 (see FIG. 9). Radiant heat flux (radiant heat transferred per unit of area) to the tube bundle 32 is going to be greater in the areas parallel 64 to the sidewalls compared to those areas perpendicular 66 to the sidewalls 22 (see FIG. 9A). This problem is commonly called shading. The imbalance in radiant heat flux in the tubes 32 leads to accelerated fouling of the tubes 32. This in turn leads to maintenance problems and shortened tube life.

Figure 10A:
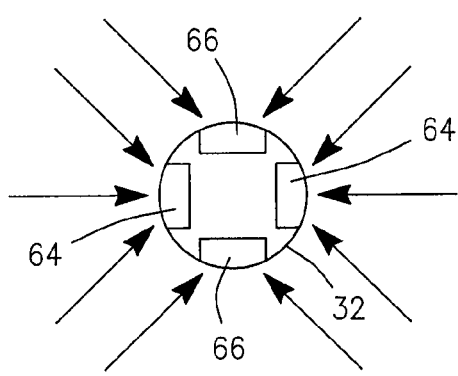
FIG. 10A is an enlarged view of the heater tube indicated in FIG. 10.

As previously mentioned the radiant heat generally is reflected or transmitted off the sidewalls 22 in a perpendicular direction. Because the angle of the sidewalls 22 of the present invention vary inside the dimples 30 the radiant heat reflects off of these sidewalls 22 in various directions relative to the heater tubes 32 (see FIG. 10). This provides a more even radiant heat flux on the tubes 32 (see FIG. 10A). The more even radiant heat flux of the present invention reduces fouling of the tubes 32 and in turn provides greater tube life and reduced maintenance.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A heater enclosure, comprising:
a pair of opposing sidewalls, each sidewall having a substantially planar internal surface;
a pair of opposing end walls, each opposing end wall being substantially perpendicular to each opposing sidewall and having a substantially planar internal surface;
an opposing top wall and bottom wall, the top wall being substantially perpendicular to each opposing sidewall and to each opposing end wall and having a substantially planar internal surface, the bottom wall being substantially perpendicular to each opposing sidewall and to each opposing end wall and having a substantially planar internal surface, wherein the internal surfaces of each wall collectively form a cavity therein;
one or more nozzles coupled to one or more walls, the nozzles introducing a fluid flow into the cavity and adjacently along the internal surface of at least one of the walls in a single direction; and
one or more structures extending inwardly from the internal surface of the wall that is adjacent to the fluid flow, the structures maintaining the fluid flow substantially adjacent along the internal surface of the wall that is adjacent to the fluid flow, and wherein the fluid flow is maintained substantially adjacent along the internal surface of one or more walls during operation of the heater enclosure,
wherein the structure comprises at least one dimple, and
wherein the surface of one or more dimples is entirely formed with a constant radius.

2. The heater enclosure of claim 1, wherein the structure comprises a valley.

3. The heater enclosure of claim 1, wherein the structure comprises a plurality of dimples arranged in an array, the array comprising at least a first row and a second row, each row comprising two or more dimples.

4. The heater enclosure of claim 3, wherein the dimples of the first row are positioned offset relative to the dimples of the second row.

5. The heater enclosure of claim 4, wherein the offset is approximately 9 inches.

6. The heater enclosure of claim 1, further comprising a plurality of tubes passing through at least a portion of the cavity.

7. The heater enclosure of claim 1, wherein the dimple comprises a diameter of approximately 6 inches.

8. The heater enclosure of claim 1, wherein the dimple comprises a depth of approximately 3/4 of an inch.

9. The heater enclosure of claim 1, wherein the one or more nozzles comprises a plurality of nozzles.

10. A method for operating a heater enclosure, the method comprising:
providing a combustion chamber having a pair of opposing sidewalls, a pair of opposing end walls, and a top wall opposing a bottom wall, each wall being substantially planar and positioned to collectively define a cavity therein;
inducing a fluid flow within the cavity and adjacently along at least one of the walls in a single direction, the fluid flow comprising a fuel component, an air component, and a combustion product component, and
providing at least one structure on the wall that is adjacent to the fluid flow, the structures creating a beneficial pressure gradient that maintains the fluid flow adjacently against the wall, and wherein the fluid flow is maintained substantially adjacent along the internal surface of one or more walls during operation of the heater enclosure,
wherein the structure comprises at least one dimple, and
wherein the surface of one or more dimples is entirely formed with a constant radius.

11. The method of claim 10, wherein the structure comprises a valley.

12. The method of claim 10, wherein the dimple comprises a diameter of approximately 6 inches.

13. The method of claim 10, wherein the dimple comprises a depth of approximately 3/4 of an inch.

14. The method of claim 10, wherein the structure comprises a plurality of dimples arranged in an array, the array comprising at least a first row and a second row, each row comprising two or more dimples.

15. The method of claim 14, wherein the dimples of the first row are positioned offset relative to the dimples of the second row.

16. A heater enclosure, comprising:
a pair of opposing sidewalls, each sidewall having a substantially planar internal surface;
a pair of opposing end walls, each opposing end wall being substantially perpendicular to each opposing sidewall and having a substantially planar internal surface;
an opposing top wall and bottom wall, the top wall being substantially perpendicular to each opposing sidewall and to each opposing end wall and having a substantially planar internal surface, the bottom wall being substantially perpendicular to each opposing sidewall and to each opposing end wall and having a substantially planar internal surface, wherein the internal surfaces of each wall collectively form a cavity therein;
one or more nozzles coupled to one or more walls, the nozzles introducing a fluid flow into the cavity and adjacently along the internal surface of at least one of the walls, the fluid flow undergoing combustion thereby producing heat; and
one or more dimples extending inwardly from the internal surface of the wall that is adjacent to the fluid flow, the dimples maintaining the fluid flow substantially adjacent along the internal surface of the wall that is adjacent to the fluid flow,
wherein the depth of one or more dimples is entirely formed with a constant radius, the dimples directing the heat radiantly towards a plurality of tubes and reducing peak radiant flux rates exposed on the plurality of tubes, the plurality of tubes passing through at least a portion of the cavity.

17. The heater enclosure of claim 16, wherein the dimples are arranged in an array, the array comprising at least a first row and a second row, each row comprising two or more dimples.

18. A heater enclosure, comprising:
a pair of opposing sidewalls, each sidewall having a substantially planar internal surface;
a pair of opposing end walls, each opposing end wall being substantially perpendicular to each opposing sidewall and having a substantially planar internal surface;
an opposing top wall and bottom wall, the top wall being substantially perpendicular to each opposing sidewall and to each opposing end wall and having a substantially planar internal surface, the bottom wall being substantially perpendicular to each opposing sidewall and to each opposing end wall and having a substantially planar internal surface, wherein the internal surfaces of each wall collectively form a cavity therein;

one or more air supply nozzles coupled to one or more walls, the air supply nozzles introducing an air flow into the cavity and adjacently along the internal surface of at least one of the walls;

one or more fuel supply nozzles coupled to one or more walls, the fuel supply nozzles introducing a gas flow into the cavity and adjacently along the internal surface of the same wall that the air flow is introduced, the gas flow and the air flow being combined within the cavity to form at least a portion of a fluid flow; and one or more structures extending inwardly from the internal surface of the wall that is adjacent to the fluid flow, the structures maintaining the fluid flow substantially adjacent along the internal surface of the wall that is adjacent to the fluid flow, wherein the fluid flow undergoes flameless combustion, thereby generating heat, wherein the structure comprises at least one dimple, and wherein the depth of one or more dimples is entirely formed with a uniform radius.

19. The heater enclosure of claim 18, further comprising a plurality of tubes passing through at least a portion of the cavity.

20. The heater enclosure of claim 19, wherein the structures comprise at least one dimple, the dimples directing the heat radiantly towards the plurality of tubes and reducing peak radiant flux rates exposed on the plurality of tubes.

21. The heater enclosure of claim 18, wherein the structure comprises a plurality of dimples arranged in an array, the array comprising at least a first row and a second row, each row comprising two or more dimples.

* * * * *